Figures 1, 2, 3:
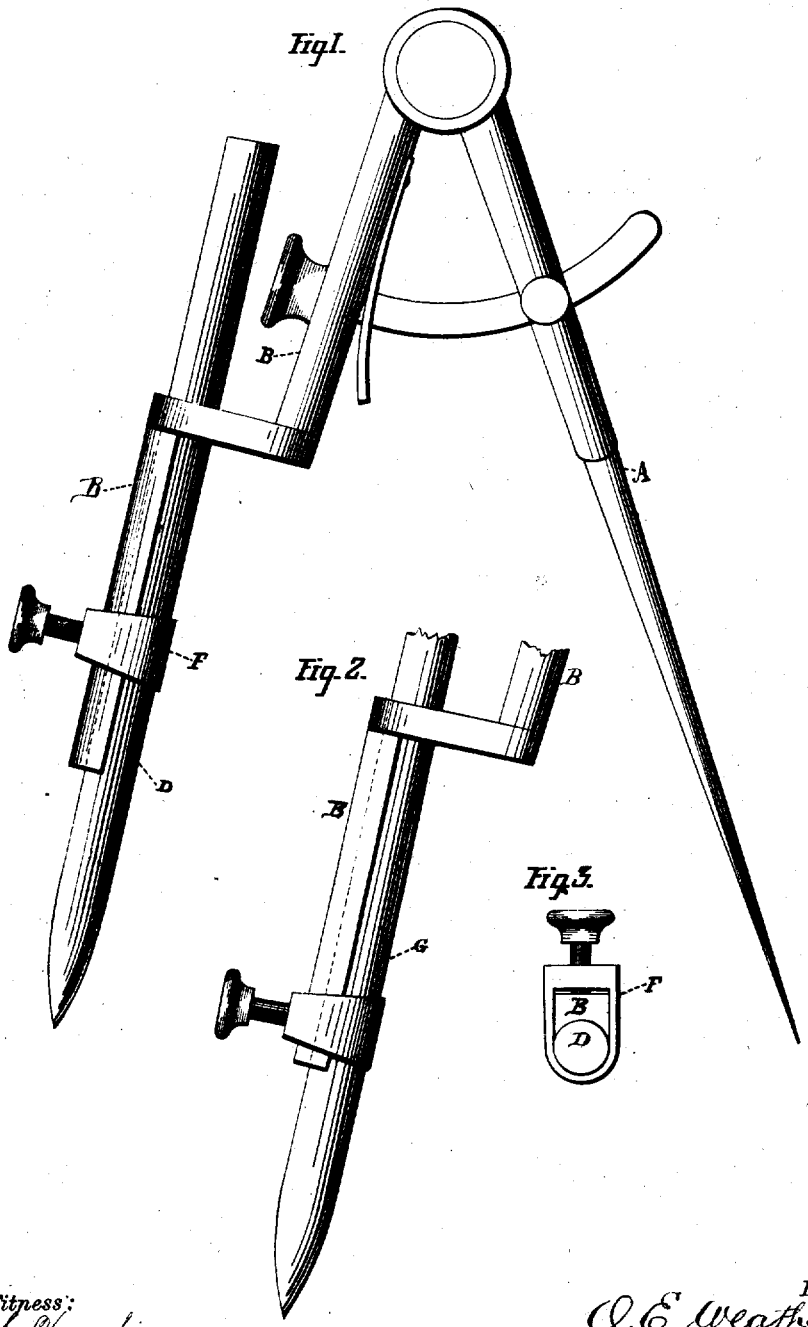

O. E. WEATHERHEAD.

Dividers.

No. 5,290. Reissued Feb. 18, 1873.

Witness:
Jas. C. Hutchinson
C. L. Evert.

Inventor.
O. E. Weatherhead.
per
Munn & Mason
Attorneys.

AM. PHOTO-LITHOGRAPHIC CO. N.Y. (OSBORNE'S PROCESS.)

UNITED STATES PATENT OFFICE.

O. E. WEATHERHEAD, OF ASHLAND, MASSACHUSETTS, ASSIGNOR TO ALBERT A. COOKE, GEORGE L. COOKE, AND S. W. COOKE.

IMPROVEMENT IN DIVIDERS.

Specification forming part of Letters Patent No. 72,433, dated December 17, 1867; reissue No. 5,290, dated February 18, 1873.

*To all whom it may concern:*

Be it known that I, O. E. WEATHERHEAD, formerly of Winchendon, in the county of Worcester and State of Massachusetts, now of Ashland, Middlesex county, Massachusetts, have invented certain new and useful Improvements in Dividers; and do hereby declare the following to be a full, clear, and exact description thereof, reference being had to the accompanying drawing and to the letters of reference marked thereon.

The object of my invention is to so construct a pair of dividers that a metal leg of suitable form may be applied and adjusted to a desired length, or that a pencil may be employed to mark circles or segments thereof. My invention, therefore, consists in a leg or arm of a pair of dividers bent outward and grooved and attaching thereto a movable point or pencil by means of a clamping device.

Figure 1 in the drawing represents a pair of dividers, showing one commonly-formed leg or arm and a bent and grooved leg or arm with a clamping device and movable point attached. Fig. 2 represents the same without the attachment of the commonly-known form of arm. Fig. 3 represents an end view of the bent leg or arm, the movable point, and a clamping device. These dividers consist of two legs, which are hinged or pivoted together in any of the well-known and usual ways.

The leg A, shown in the drawing, is made perfectly plain, and pointed at its outer end, as is usually the case, and to which I make no claim. The other leg, B, a short distance from the hinge or pivot, is suitably bent outward, so that when the two legs are separated or opened a short distance their outer ends will be parallel. The leg B is not intended to be as long as the ordinarily-constructed leg A, and is grooved or made concave, so that a lead-pencil or metal extension may lie partially within it. F represents a metal loop or clamp which is used with the leg B. This clamp is provided with a suitable set-screw for the purpose of clamping or firmly securing the pencil or extension-leg in the groove in the inner side of the leg B. The clamping device may be slipped along upon the leg B so as to clamp the pencil at any desired point.

Having thus fully described my invention, what I claim as new, and desire to secure by Letters Patent, is—

1. The leg of a pair of dividers when grooved or made concave, as and for the purpose set forth.

2. A clamping device, when used in combination with the grooved or concave leg of a pair of dividers, for the purpose set forth.

In testimony that I claim the foregoing I have hereunto set my hand and seal this 25th day of December, 1872.

O. E. WEATHERHEAD. [L. S.]

Witnesses:

ALBERT A. BROWNE,
W. A. TILTON.